United States Patent
Kunkel

(12)
(10) Patent No.: US 6,348,151 B1
(45) Date of Patent: Feb. 19, 2002

(54) DEVICE FOR STERILIZING AND FILTERING WATER WHICH FLOWS THROUGH A SANITARY DEVICE

(75) Inventor: Horst Kunkel, Stuttgart (DE)

(73) Assignee: Hansa Metallwerke AG (DE)

( * ) Notice: Subject to any disclaimer, the term of this patent is extended or adjusted under 35 U.S.C. 154(b) by 0 days.

(21) Appl. No.: 09/486,126
(22) PCT Filed: Jul. 14, 1998
(86) PCT No.: PCT/EP98/04357
  § 371 Date: May 30, 2000
  § 102(e) Date: May 30, 2000
(87) PCT Pub. No.: WO99/10279
  PCT Pub. Date: Mar. 4, 1999

(30) Foreign Application Priority Data

Aug. 22, 1997 (DE) .......................................... 197 36 633

(51) Int. Cl.⁷ .............................. C02F 1/32; C02F 9/00; B01D 35/00; B01D 36/00; B01J 19/12
(52) U.S. Cl. .................... 210/209; 210/198.1; 210/748; 210/760; 210/256; 210/260; 422/24; 422/186.3
(58) Field of Search ................................ 210/748, 256, 210/209, 198.1, 760; 422/186.3, 24

(56) References Cited

U.S. PATENT DOCUMENTS

| 3,551,091 A | * | 12/1970 | Veloz |
| 4,694,179 A | * | 9/1987 | Lew et al. |
| 4,766,321 A | * | 8/1988 | Lew et al. |
| 5,540,848 A | * | 7/1996 | Engelhard |

FOREIGN PATENT DOCUMENTS

| DE | 2461290 A | * | 7/1976 |
| EP | 531817 | * | 3/1993 |
| JP | 55-086509 A | * | 6/1980 |

* cited by examiner

Primary Examiner—Thomas M. Lithgow

(57) ABSTRACT

A device for sterilizing and filtering water which flows through a sanitary device consists of a treatment cavity (19) located inside of housing (2,3,4) through which water can flow. The treatment cavity is subdivided into a multitude of partial cavities (51a, 51b) by a suitably formed filter device (50). The flowing water and filter device (50) are irradiated by an ultraviolet lamp (12) and the filter device is made of a single sintered body which transmits UV radiation thereby allowing the water to be filtered to remove microorganisms and then to be killed.

6 Claims, 4 Drawing Sheets

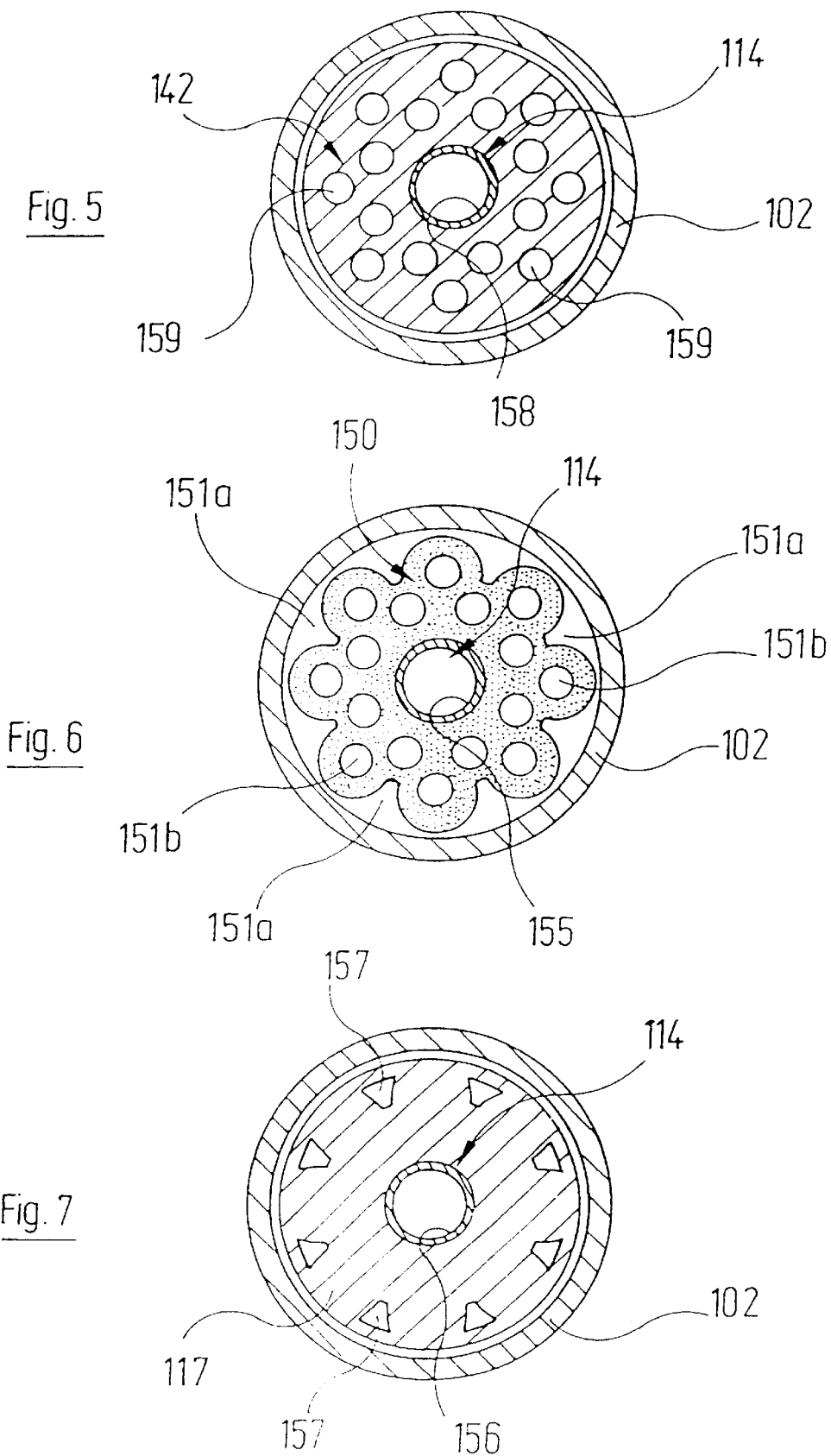

DEVICE FOR STERILIZING AND FILTERING WATER WHICH FLOWS THROUGH A SANITARY DEVICE

Figure 1:
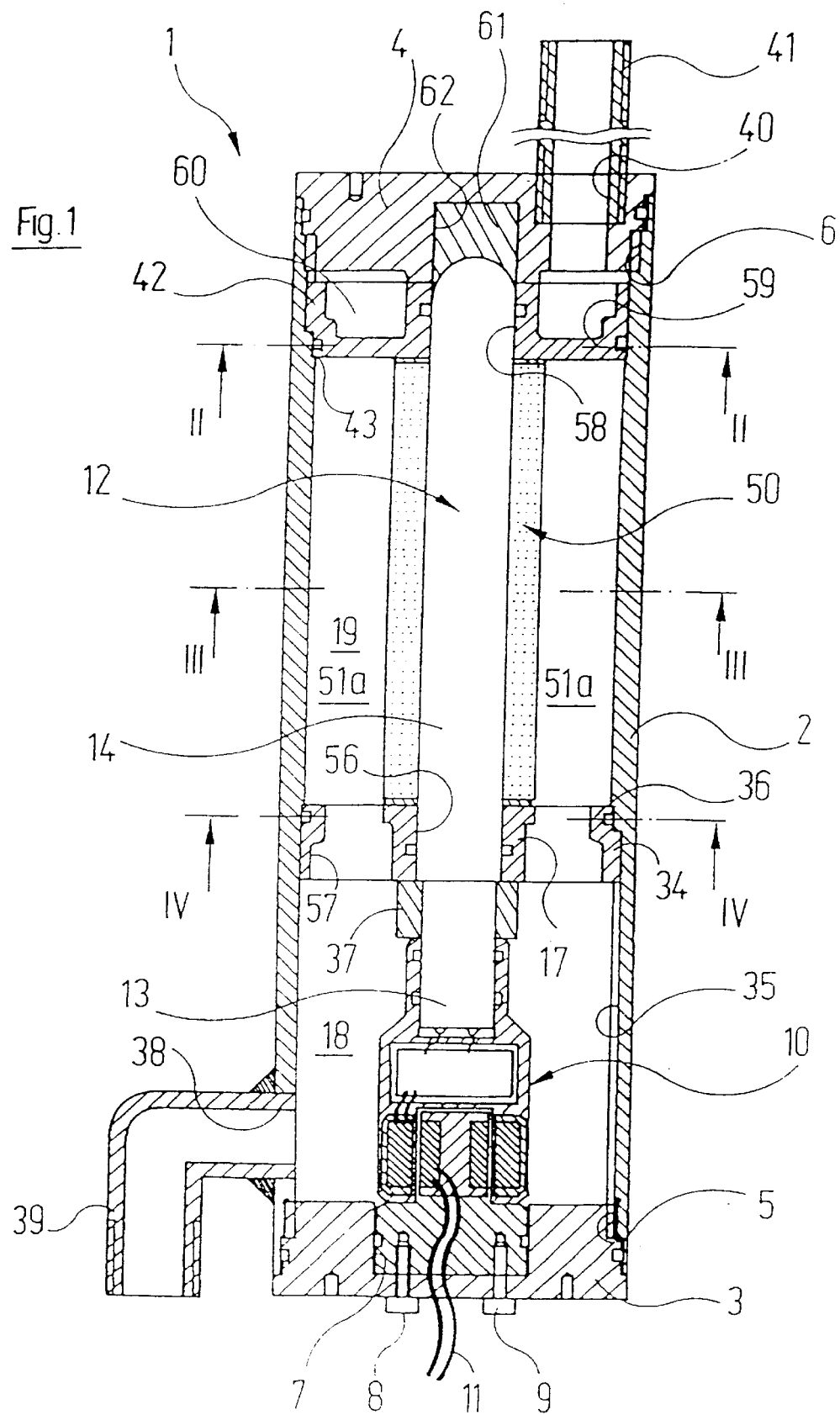

The invention relates to a device for sterilizing and filtering water flowing through a sanitary appliance, having a) a housing, which comprises an inlet and an outlet for the water;

b) a filtering apparatus, which is disposed in a treatment chamber inside the housing and subdivides the treatment chamber into at least two sub-chambers and through which the water travelling between the inlet and the outlet of the housing has to pass;

c) a UV lamp, which is disposed inside the housing and the radiation of which is directed towards the water flowing through and towards the filtering apparatus.

In recent years the dangers arising in the field of sanitation from water contaminated with micro-organisms, in particular bacteria, amoebae or other monocellular organisms, have become ever clearer. For said reason, increased importance is being attached to water sterilization. In said connection, there have been reports of experiments to sterilize flowing water through exposure to UV light, which is of a wavelength suitable for killing micro-organisms carried along in the water. To extend the retention time of said micro-organisms in the region of the UV lamp, use was made of filtering apparatuses, by which the micro-organisms were retained. Said filtering apparatuses subdivided the treatment chamber into only two sub-chambers, of which the one was connected to the inlet of the device, the other to the outlet of the device. This produced a relatively small effective surface of the filtering apparatus, resulting not only in a relatively low throughput of water but also in a relatively short useful life of the filtering apparatus.

U.S. Pat. No. 5,540,848 A describes a water sterilizing device disposed in a canister and having a UV lamp, around which water which is to be sterilized flows. In the process, the water also passes through a filter body of the type described above, which in a sleeve-like manner surrounds a part of the UV lamp.

In the water sterilizing device designed for a swimming pool according to EP 0 531 817 A, a series of different purifying devices are provided. In a disinfecting device, water is sterilized through irradiation by a UV lamp. Provided as a filtering device is i.a. a device having a plurality of filters, which in turn are subdivided into a plurality of sub-chambers and disposed in a housing. In one embodiment, the UV lamp lies inside a concentric arrangement of filters, wherein the outer-lying filter comprises a ceramic filter body.

Said known devices are disposed upstream of the actual water removal points (dispensing points). Here, there is always still the risk of germs collecting in the water channel from the sterilizing device to the dispensing point. Sterilization of said water channel is not possible by means of the known sterilizing devices.

The object of the present invention is therefore to refine a device of the type described initially in such a way that reliable sterilization of the water at the water removal point is guaranteed.

Said object is achieved according to the invention in that d) the housing is so dimensioned that the device is insertable into the water channel of a sanitary appliance;

e) the filtering apparatus is a sintered body which transmits UV radiation;

f) the sub-chambers of the treatment chamber are subdivided into two sets, of which at least one comprises a plurality of sub-chambers;

g) the sub-chambers of the one set communicate with the inlet of the housing and the sub-chambers of the other set communicate with the outlet of the housing, wherein h) the sub-chambers of the one set are separated from the sub-chambers of the other set by active filter regions of the filtering apparatus.

The dimensioning of the water sterilizing device such that the latter may be installed in a sanitary appliance guarantees reliable sterilization of the water up to the removal point, with the result that the removed water is reliably sterilized.

The required compact nature of the device means that the purifying components have to be fashioned in such a way that, given a small overall design, the throughput is increased and the service life of the filtering apparatus extended. According to the invention, therefore, a plurality of sub-chambers are used at the inlet side and/or the outlet side of the filtering apparatus. Said plurality of sub-chambers increases the effective surface of the filtering apparatus, thereby enabling a greater throughput. What is more, the filtering apparatus with a larger active filter surface may pick up more impurities before it is exhausted and has to be exchanged.

Designing the filtering apparatus as a sintered body, which transmits UV radiation, guarantees on the one hand an efficient filtering action and on the other hand a sterilizing effect by the UV radiation also inside the filtering apparatus.

When the sub-chambers of at least one of the two sets extend along a lateral surface of the filtering apparatus, manufacture of the filtering apparatus is particularly easy: all that is necessary is to provide a suitable surface contour which, for example, takes the form of paraxial channels or grooves in the lateral surface of the filtering apparatus.

Given said design principle, there are again two distinct preferred variants. Either the sub-chambers of at least one set are formed between the outer lateral surface of the filtering apparatus and the inner surface of the housing: manufacture of the filtering apparatus is then particularly easy because the requisite channels or grooves may easily be introduced in the outer lateral surface. Or the sub-chambers of at least one set are formed between an inner lateral surface of the filtering apparatus and the luminous element of the UV lamp: it is then guaranteed that the water flowing through said sub-chambers is always reached by the UV rays, even when the filter is extremely clogged.

The sub-chambers of at least one set may alternatively take the form of through-bores of the filtering apparatus. This automatically satisfies the requirement of the sub-chambers that active filter material has to be passed through along the path between the sub-chambers of the one set and the sub-chambers of the other set.

Particularly preferred is the refinement of the invention, in which the sub-chambers are delimited at opposite ends in each case by an intermediate plate, wherein each intermediate plate has through-openings, which communicate with one of the two sets of sub-chambers. It is then namely possible for the geometric contours of the filtering apparatus, which delimit the sub-chambers at one side, to be made constant over the entire filtering apparatus in axial direction. The assignment of the sub-chambers to the two sets is effected in a simple manner by means of the two intermediate plates, which in each case close one of the two sets of sub-chambers and connect the other set of sub-chambers either to the inlet or to the outlet of the device.

Figure 2:
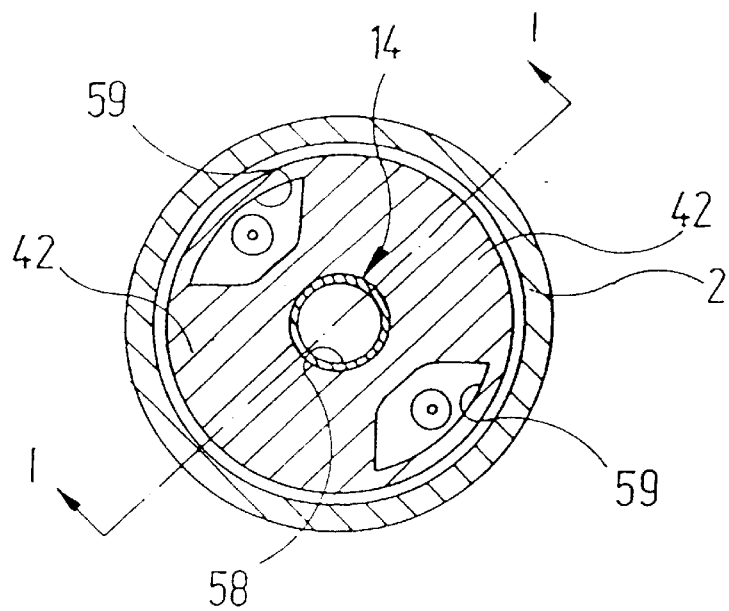
Figure 3:
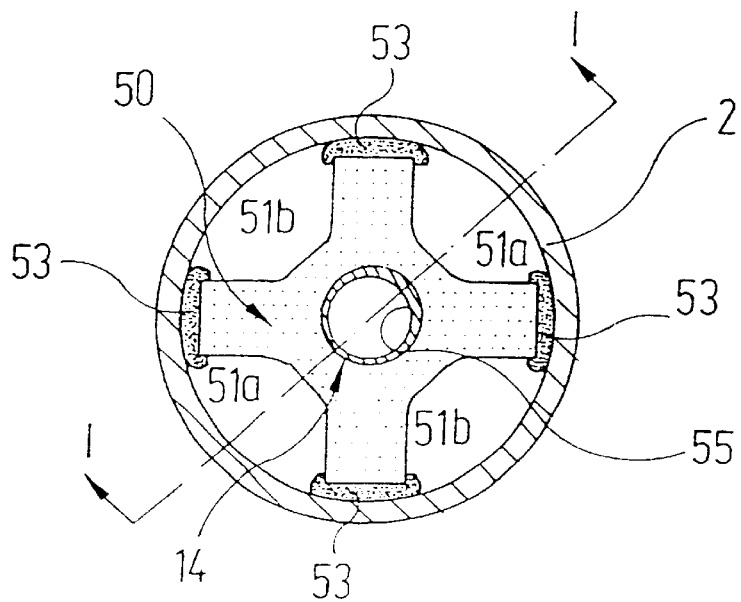
Figure 4:
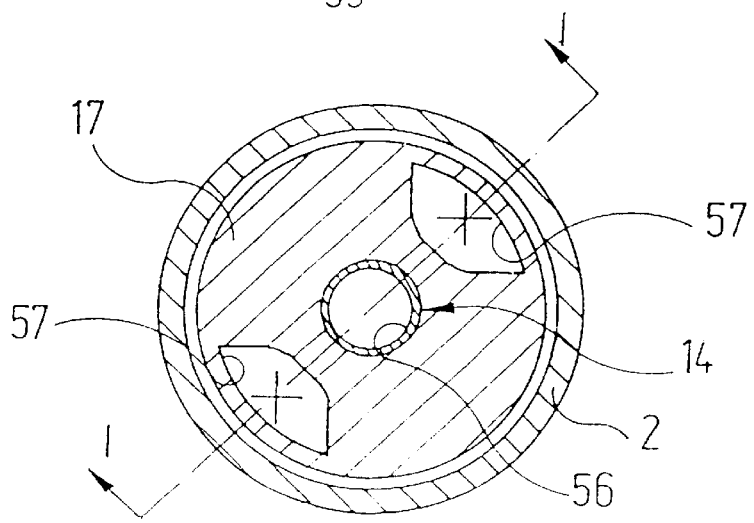
Figure 8:
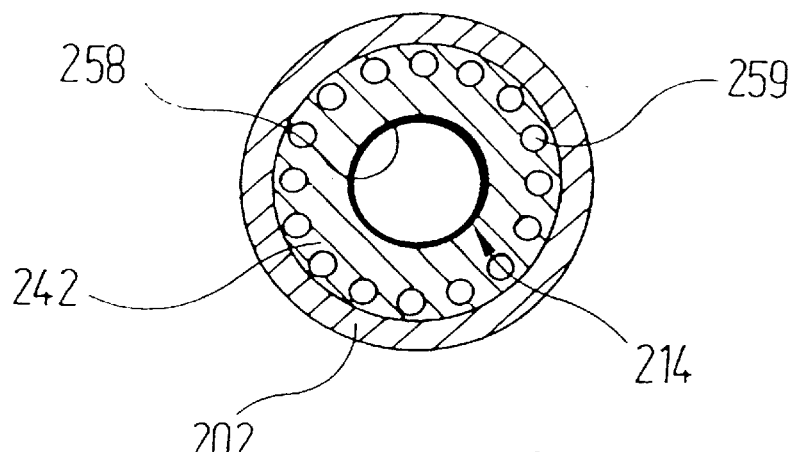
Figure 9:
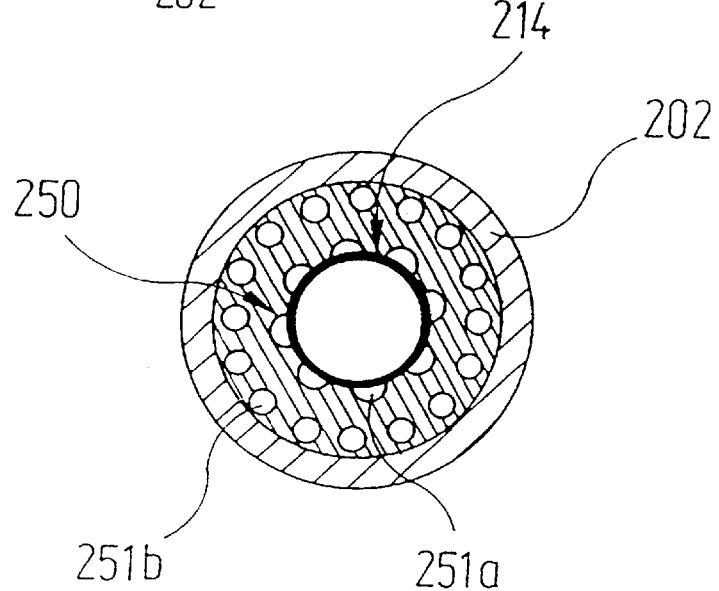
Figure 10:
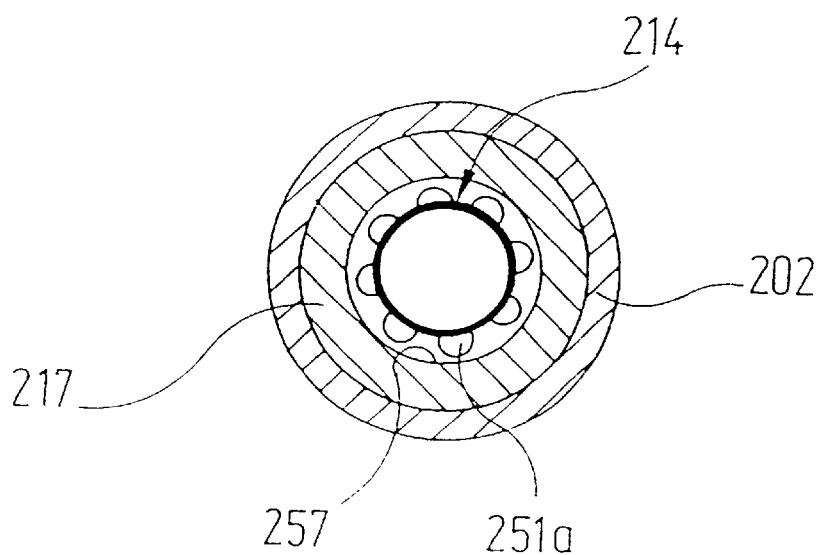

Embodiments of the invention are described in detail below with reference to the drawings; said drawings show:

FIG. 1: an axial section through a device for sterilizing and filtering water, which may be housed in a sanitary appliance, along line I—I of FIGS. 2 to 4;

FIG. 2: a section along line II—II of FIG. 1;

FIG. 3: a section along line III—III of FIG. 1;

FIG. 4: a section along line IV—IV of FIG. 1;

FIGS. 5–7: sections, similar to FIGS. 2 to 7, through a second embodiment;

FIGS. 8–10: sections, similar to FIGS. 2 to 4, through a third embodiment of the invention.

The device for sterilizing and filtering water, which is illustrated in the drawings, is intended for installation in a water channel of a sanitary appliance. All of the dimensions are therefore such that they fit in such a flow channel. The device, which is denoted as a whole by the reference character 1, comprises a substantially cylindrical housing jacket 2 which is closed at the opposite ends by a base 3 and a lid 4. The connection between the housing jacket 2 and the base 3 or lid 4 is effected in the illustrated embodiment with the aid of threads 5, 6 so that, after removal of said components, the interior of the housing jacket 2 is accessible.

A connection backplate 10, which is used to receive the cap region 13 and hence for the power supply of an elongate UV lamp 12 and is connected by lines 11 to an external power source (not shown), is fastened with the aid of screws 8, 9 in a recess 7 at the inside of the base 3. In the illustrated embodiment the connection backplate 10, for reasons which are not of greater interest here, is subdivided into two parts, which are detachably inserted one into the other and inductively electrically coupled to two coils, which are housed one in each of the two parts so as to be adjacent to one another.

A first intermediate plate 17, which is inserted from below into the housing 2, 3, 4, is fixed in the interior of the housing 2, 3, 4, wherein for determining the rotational position a radially projecting rib 34 is introduced into a groove 35 in the inner wall of the housing jacket 2. The first intermediate plate 17 lies in an upward direction against a small step 36 of the inner wall of the housing jacket 2. In a downward direction the first intermediate plate 17 is supported via a distance piece 37 on the connection backplate 10.

The first intermediate plate 17 subdivides the interior of the housing 2, 3, 4 into an afflux chamber 18 and a treatment chamber 19. The afflux chamber 18 substantially surrounds the connection backplate 10, while the treatment chamber 19 surrounds the luminous element 14 of the UV lamp 12. Welded in a lateral opening 38, which penetrates the cylindrical housing jacket 2, is an angled connection piece 39 used to feed water into the afflux chamber 18 of the housing 2, 3, 4. In the lid 4 a paraxial bore 40 is provided, into which is screwed a discharge connection piece 41, through which the purified water passes back out of the device 1.

In the top region of the housing 2, 3, 4, below the lid 4, a second intermediate plate 42 is fastened in a similar manner to that described above for the first intermediate plate 17. However, said second intermediate plate 42 is introduced from above into the housing 2, 3, 4. It is pressed by the lid 4 against a step 43 of the inner wall of the housing jacket 2.

In the region lying between the two intermediate plates 17 and 42 the luminous element 14 of the UV lamp 12 is surrounded by a filtering apparatus, which as a whole bears the reference character 50. The filtering apparatus comprises a sintered body 50 made of suitable material, which has the cross-sectional configuration shown in FIG. 3; it is substantially in the shape of a cross, which subdivides the interior of the housing 2, 3, 4 into four sub-chambers 51a, 51b. For sealing said four sub-chambers 51a, 51b, the longitudinal edges of the sintered body 50 rest via profiled seals 53 against the inner wall of the housing jacket 2. The entire sintered body 50 is penetrated by an axial through-bore 55, in which the luminous element 14 of the UV lamp 12 is accommodated.

As FIG. 4 reveals, the first intermediate plate 17 has a central through-opening 56, which receives the bottom region of the luminous element 14 of the UV lamp 12, as well as openings 57 in the shape of a segment of a circle, which in the assembled state communicate with the mutually opposing sub-chambers 51a inside the housing 2, 3, 4.

In a similar manner, as FIG. 2 reveals, the second intermediate plate 42 is provided with a central through-opening 58, into which the top end of the luminous element 14 of the UV lamp 12 is inserted. Two openings 59 in the shape of a segment of a circle communicate, on the one hand, with the mutually opposing sub-chambers 51b inside the housing 2, 3, 4 and, on the other hand, with an annular chamber 60, which in turn communicates with the discharge connection piece 41.

Finally, there is inserted into a central recess 62 of the lid 40 a resilient pad 61, into which the top end of the luminous element 14 of the UV lamp 12 is pressed, with the result that the UV lamp 12 is gently fixed inside the device 1.

The device 1 described above operates as follows:

When the sanitary appliance, e.g. a draw-off appliance having the device 1 installed in its flow channel, is opened, water flows through the connection piece 39 into the afflux chamber 18 inside the housing 2, 3, 4. The UV lamp 12 is switched on. The water having entered the afflux chamber 18 flows on from there through the openings 57 in the shape of a segment of a circle in the first intermediate plate 17 into the sub-chambers 51a of the treatment chamber 19, which in said sense form a first "set" of sub-chambers. From there, the water passes through the "limbs" or "arms" of the, in cross section, cross-shaped sintered body 50 and hence into the adjacent sub-chambers 51b, which in said sense form a second "set" of sub-chambers. In the process, the particles which are contained in the water and are to be filtered out, but in particular micro-organisms such as amoebae and similar monocellular organisms, are retained by the sintered body 50. The thus purified water flows off—in FIG. 1—in an upward direction through the sub-chambers 51b of the treatment chamber 19, through the openings 59 in the shape of a segment of a circle in the second intermediate plate 42 and through the annular chamber 60 to the discharge connection piece 41 and from there to the outlet (not shown) of the sanitary appliance.

The water, as it passes through the treatment chamber 19, is exposed to the disinfecting rays of the UV lamp 12. The micro-organisms trapped in the filter body 50 are killed under the influence of the UV radiation.

When access is to be gained to the sintered body 50, e.g. when the latter after a specific operating time has become clogged with trapped impurities, this may be effected either by unscrewing the base 3 from the housing jacket 2 of the device 1 and withdrawing the connection backplate 10 with the UV lamp 12 in a downward direction. The first intermediate plate 17 may then also be removed in a downward direction, after which the sintered body 50 is accessible.

Alternatively, the sintered body 50 may also be reached from above by unscrewing the lid 4. The second intermediate plate 42 may then be removed in an upward direction, thereby exposing the sintered body 50. The latter may then be withdrawn—in the view of FIG. 1—up over the luminous element 14 of the UV lamp 12.

Reassembly is effected in both cases in the reverse order.

In the embodiment described above with reference to FIGS. 1 to 4 there were inside the treatment chamber 19 two sets of two, i.e. altogether four "sub-chambers" 51a and 51b, of which two, namely the sub-chambers 51a belonging to the first set, received contaminated water to be sterilized and were in communication with the afflux chamber 18, while the other two, namely the sub-chambers 51b and 51d belonging to the second set, carried away filtered water after passage through the filter body 50 towards the discharge connection piece 41. Said concept of the plurality of sub-chambers in two sets, of which the one is used to feed contaminated water and the other to carry away filtered water, may be followed through even more consistently by providing, instead of two x two sub-chambers, a greater number of sub-chambers. An example of this is shown in FIGS. 5 to 7, which are likewise to be understood as sections along the lines II—II, III—III, IV—IV, only with a modified filter body. Corresponding parts in FIGS. 5 to 7 are therefore denoted by the same reference characters as in FIGS. 2 to 4, plus 100.

FIGS. 5 to 7 once again show the cylindrical housing jacket 102 as well as the luminous element 114 of the UV lamp, components which have remained unaltered compared to FIGS. 2 to 4.

The cross section of the sintered body 150 shown in FIG. 6 resembles a "flower". It has a peripheral contour, which is composed of a plurality of semicircular arcs and together with the inner surface of the housing jacket 102 delimits a corresponding number of sub-chambers 151a. Although the radially outermost regions of the semicircular arcs, which form the peripheral contour of the sintered body 150, do extend very close up to the inner wall of the housing jacket 102, they are not sealed against said inner wall. In said sense, all of the sub-chambers 151a in the embodiment of FIGS. 5 to 7 communicate with one another.

The interior of the sintered body 150 between the central through-bore 155, which receives the luminous element 114, and said external contour is penetrated by a plurality of paraxial through-bores 151b. Said through-bores 151b lie on concentric circles and are distributed substantially uniformly over the cross section of the sintered body 150.

The first intermediate plate 117 shown in FIG. 7 has in its radially outerlying region a plurality of gore-shaped through-openings 157, which in the assembled state communicate with the sub-chambers 151a between the outside edge of the sintered body 150 and the inner wall of the housing jacket 102. Said sub-chambers 151a therefore form, in the terminology used here, a first "set". In an analogous manner thereto, the second intermediate plate 142 shown in FIG. 5 comprises a plurality of through-bores 159, which communicate—in FIG. 1—in a downward direction with the through-bores 151b of the sintered body 150 and at the upwardly directed side with the annular chamber 60 (FIG. 1) and hence with the discharge connection piece 41. The through-bores 151b therefore form a second set.

During operation of said device, the water to be filtered flows through the through-openings 157 of the first intermediate plate 117 into the first set of sub-chambers 151a of the treatment chamber, passes from there out of the active filter material of the sintered body 150 into one of the plurality of through-bores 151b, belonging to the second set, of the sintered body 150 and flows out through the through-bores 159 of the second intermediate plate 142. By virtue of the relatively large inner surface provided by the plurality of sub-chambers 151a and 151b inside and outside of the sintered body 150, the sintered body 150 has a long service life. The restriction of the water flow is low.

Whereas in the embodiment shown in FIGS. 5 to 7 the incoming water, i.e. the water to be filtered, was fed to the sintered body 150 at the outer periphery, this is effected in the embodiment according to FIGS. 8 to 10 at the inner periphery. Otherwise said Figures also strongly resemble the embodiment shown in FIGS. 2 to 4. For said reason, corresponding parts have been denoted by the same reference character, plus 200.

In FIGS. 8 to 10, the housing jacket 202 and the luminous element 214 of the UV lamp are once more the same as in the previously described embodiments.

The sintered body 250, however, the cross section of which is shown in FIG. 9, has in its inner lateral surface directed towards the luminous element 214 a plurality of, in cross section, semicircular, channel-like recesses 251a. Radially further out, the sintered body 250 is penetrated by a plurality of paraxial through-bores 251b. Two of said through-bores 251b (in FIG. 9 on the left and right) are kept slightly smaller in diameter so as to facilitate a correct angular orientation of the sintered body 250 inside the housing.

As FIG. 10 reveals, the first intermediate plate 217 is annular in shape, wherein its outside diameter corresponds approximately to the inside diameter of the housing jacket 202 and the diameter of the inner opening 257 is selected so as to allow a flow against the sub-chambers 251a between the inner periphery of the sintered body 250 and the luminous element 214 of the UV lamp. In said manner, said sub-chambers 251a are combined into a "set".

The second intermediate plate 242 shown in FIG. 8, besides the central through-opening 258 for the luminous element 214, has in the peripheral region a plurality of through-bores 259 which, in the assembled state, communicate on the one hand with the through-bores 251b of the sintered body 250 (FIG. 9) and on the other hand with the annular chamber lying on the path towards the discharge connection piece. The through-bores 251b of the sintered body 250 therefore become members of a second set of sub-chambers.

Compared to the embodiment of FIGS. 5 to 7, the embodiment according to FIGS. 8 to 10 has the advantage that the incoming water, independently of the loaded state of the sintered body 250, always travels some distance in the immediate vicinity of the luminous element 214 and is therefore always reached directly by the UV radiation emitted by said luminous element 214.

What is claimed is:

1. Device for sterilizing and filtering water flowing through a sanitary appliance, having:
   a) a housing, which comprises an inlet and an outlet for the water;
   b) a filtering apparatus, which is disposed in a treatment chamber inside the housing and subdivides the treatment chamber into at least two sub-chambers and through which the water travelling between the inlet and the outlet of the housing has to pass;
   c) a UV lamp, which is disposed inside the housing and the radiation of which is directed towards the water flowing through and towards the filtering apparatus; characterized in that
   d) the housing is so dimensioned that the device is installed in the water channel of a sanitary appliance;
   e) the filtering apparatus is a single sintered body which transmits UV radiation;

f) the sub-chambers of the treatment chamber are subdivided into two sets, of which at least one comprises a plurality of sub-chambers, g) the sub-chambers of the one set communicate with the inlet of the housing and the sub-chambers of the other set communicate with the outlet of the housing, wherein h) the sub-chambers of the one set are separated from the sub-chambers of the outer set by active filter regions of the filtering apparatus.

2. Device according to claim 1, charaterized in that the sub-chambers of at least one of the two sets extend along a lateral surface of the filtering apparatus.

3. Device according to claim 2, characterized in that the sub-chambers of at least one set are formed between the outer lateral surface of the filtering apparatus and the inner surface of the housing.

4. Device according to claim 2, characterized in that the sub-chambers of at least one set are formed between an inner lateral surface of the filtering apparatus and the luminous element of the UV lamp.

5. Device according to claim 1, characterized in that the sub-chambers of at least one set take the form of through-bores of the filtering apparatus.

6. Device according to claim 1, characterized in that the sub-chambers are delimited at opposite ends in each case by an intermediate plate, wherein each intermediate plate has through-openings, which communicate with one of the two sets of sub-chambers.

* * * * *